United States Patent [19]

Schneider et al.

[11] Patent Number: 4,598,062

[45] Date of Patent: Jul. 1, 1986

[54] IRON OXIDE-CHROMIUM OXIDE CATALYST AND PROCESS FOR HIGH TEMPERATURE WATER-GAS SHIFT REACTION

[75] Inventors: Michael Schneider, Ottobrunn-Riemerling; Joachim Pohl, Düsseldorf; Karel Kochloefl, Moosburg; Ortwin Bock, Landshut, all of Fed. Rep. of Germany

[73] Assignee: Süd-Chemie Aktiengesellschaft, Munich, Fed. Rep. of Germany

[21] Appl. No.: 610,746

[22] Filed: May 16, 1984

[30] Foreign Application Priority Data

May 18, 1983 [DE] Fed. Rep. of Germany ....... 3318131

[51] Int. Cl.[4] .................. B01J 21/10; B01J 23/26; B01J 23/78; B01J 23/86
[52] U.S. Cl. ................................. 502/306; 502/316; 502/319; 502/328; 502/338; 502/340; 502/524; 423/594; 423/596; 423/656
[58] Field of Search ............... 502/306, 305, 316, 313, 502/328, 338, 340, 524; 423/656, 594, 595, 596

[56] References Cited

U.S. PATENT DOCUMENTS

| | | | |
|---|---|---|---|
| 2,709,159 | 5/1955 | Daussat | 502/338 |
| 3,385,798 | 5/1968 | Mahan et al. | 502/316 |
| 3,450,787 | 6/1969 | Kehl et al. | 502/306 |
| 3,529,935 | 9/1970 | Lorenz et al. | 423/656 |
| 4,049,579 | 9/1977 | Manning | 502/306 |
| 4,140,749 | 2/1979 | Baresel et al. | 502/306 |
| 4,142,988 | 3/1979 | Chinchen | 423/656 |
| 4,143,083 | 3/1979 | Riesser | 502/312 |
| 4,166,101 | 8/1979 | Neel et al. | 423/595 |
| 4,220,560 | 9/1980 | Anquetil et al. | 502/306 |
| 4,256,722 | 3/1981 | Carrier | 423/596 |
| 4,305,846 | 12/1981 | Jennings | 502/316 |
| 4,440,632 | 4/1984 | Vasalos et al. | 208/164 |
| 4,464,480 | 8/1984 | Windawi et al. | 502/150 |
| 4,482,645 | 11/1984 | Jennings et al. | 502/316 |

FOREIGN PATENT DOCUMENTS 3318131 11/1984 Fed. Rep. of Germany ...... 502/328

*Primary Examiner*—Andrew H. Metz
*Assistant Examiner*—Anthony McFarlane
*Attorney, Agent, or Firm*—Wiliam R. Price

[57] ABSTRACT

Iron oxide-chromium oxide catalyst of increased mechanical strength (lateral crushing strength) for high-temperature water-gas shift reaction. The catalyst contains as an additional component magnesium oxide and/or magnesium spinels in the form of discrete particles.

19 Claims, No Drawings

IRON OXIDE-CHROMIUM OXIDE CATALYST AND PROCESS FOR HIGH TEMPERATURE WATER-GAS SHIFT REACTION

FIELD OF THE INVENTION

The invention relates to iron oxide-chromium oxide catalysts of increased mechanical strength for high-temperature water-gas shift reaction.

Hydrogen production from carbon monoxide and steam has for decades been one of the most important processes of the chemical industry. As is generally known, catalysts containing in particular iron oxide and chromium oxide have proved successful for high-temperature water-gas shift reaction. They are normally applied in the practice of the art at 350° to 390° C. under atmospheric pressure.

BACKGROUND OF THE INVENTION

Recently, however, units are frequently constructed which, for economic reasons, operate at elevated pressures, e.g. up to 25 or 50 bar. As experience with such units has shown, commercial iron oxide-chromium oxide catalysts lose their original mechanical strength relatively fast during the running time. This effect often causes the formation of fracture or dust and at the same time a definite increase in flow resistance.

Mechanical strength is generally understood to mean the lateral crushing strength (LSC), which is measured on catalyst tablets. With commercial iron oxide-chromium oxide catalysts, LCS losses of about 54 to 63% have been found after use in a high-temperature water-gas shift reaction plant at a pressure of 50 bar after a running time of 2000 hours. This applies also to catalysts with originally high LCS values.

Since under technical conditions the CO conversion takes place in the areas of the internal diffusion, both the porosity and the pore distribution in the catalyst compacts (in particular tablets) are of importance. The production of a catalyst with increased lateral compressive strength (15 kg/tablet) of the compacts requires the application of higher crushing pressures. This leads to a reduction of the pore volume as well as to an alteration of the pore distribution in the produced tablets and hence also to a considerable loss of apparent activity.

DESCRIPTION OF THE PRIOR ART

Another solution of the strength problem offers itself in the addition of various components which are able to increase the lateral crushing strength of the iron oxide-chromium oxide catalysts or respectively to prevent its rapid decline.

Thus it is known for example from DE-AS No. 12 52 184 that the lateral crushing strength of Co—MoO$_3$—Al$_3$O$_3$ conversion catalysts can be increased by addition of inorganic binders, such as portland cement, alumina cement, or calcium aluminate, whereby the use of these catalysts in pressure systems becomes possible. When employing this method for iron oxide-chromium oxide catalysts, one does indeed obtain an increase in lateral crushing strength; but this is at the expense of the apparent activities of the catalyst compacts.

Further, from DE-OS No. 18 12 813 teaches iron oxide-chromium oxide catalysts for water-gas shift reaction which contain as active metals iron, chromium and cobalt in the form of the oxides on an aluminum oxide support, where the cobalt oxide may be partly or wholly replaced by nickel oxide. These catalysts may further contain aluminum oxide or a mixture or compound of aluminum oxide and magnesium oxide, whereby a longer life and less sensitivity to catalyst poisons is said to be achieved. But, the use of aluminum oxide does not improve the mechanical strength of the catalysts, even when it is used in mixture with magnesium oxide. Besides, these catalysts are not suitable for use at high pressures, as the presence of cobalt and/or nickel leads to an undesired methanization or Fischer-Tropsch synthesis.

SUMMARY OF THE INVENTION

It is the object of the invention to make available iron oxide-chromium oxide catalysts of the above-defined kind which excel by their high mechanical strength, which decreases little even when the catalysts are used in water-gas shift reaction under elevated pressure, and in which the original activity of the catalysts is maintained without substantial undesirable methanization. The problem underlying the invention is solved in that the catalyst contains nickel and/or cobalt in quantities of at most 200 ppm (preferably 0 to 100 ppm) and as an additional component magnesium oxide and/or magnesium spinels (MgFe$_2$O$_4$, MgCr$_2$O$_4$) formed by reaction of magnesium oxide with iron oxide and/or chromium oxide in the form of discrete particles. Said compounds and their crystallite size can be determined by x-ray diffraction analysis. Preferably the discrete particles have an average crystallite size of 100 to 180 Å, the average crystallite size of magnesium oxide being normally 100 to 120 Å and that of the spinels normally 130 to 180 Å. Such crystallite sizes can be obtained, e.g. by using in the production of the catalysts magnesium oxide (or a precursor of magnesium oxide, such as magnesium carbonate) of which more than 70 wt.% have a particle size in the range of about 5 to 15 microns.

DESCRIPTION OF THE PREFERRED EMBODIMENT

The analytical composition of the catalysts according to the invention is preferably as follows:
80 to 90 wt.% iron oxides (Fe$^{+2}$ and/or Fe$^{+3}$);
7 to 11 wt.% Cr$_2$O$_3$;
2 to 10 wt.%, preferably 4 to 6 wt.% MgO.

Part of the magnesium is present, as mentioned above, in the form of the magnesium spinels of iron and/or chromium. Therefore, the analytical results determined for iron oxide or chromium oxide content are higher than is indicated by the concentration of the corresponding free oxides of iron or chromium, for the iron-chromium mixed oxide systems. The content of magnesium spinels depends on the intensity of the thermal treatment to which the catalyst is exposed.

The catalyst according to the invention is preferably obtainable by adding magnesium oxide or a precursor stage transformable into magnesium oxide during calcining to the iron oxide-chromium oxide component. Alternately, the magnesium component may be added to a precursor stage transformable into the latter during calcining, prior to calcination of the mixture.

A precursor stage of the iron oxide-chromium oxide component is, e.g. a mixture of the hydroxides and/or oxide hydrates of iron and of chromium, in which the iron is present in bi and/or trivalent form and the chromium generally in trivalent form. Suitable as precursor stage of magnesium oxide are, for example, magnesium hydroxide, carbonate, acetate, formate and/or oxalate.

The magnesium oxide, or respectively the precursor thereof, can be added to an aqueous suspension or to a precipitated mass of the iron oxide-chromium oxide component or the precursor thereof, the obtained mixture being calcined (in the first case after removal of the aqueous phase). The magnesium oxide or its precursor (e.g., magnesium hydroxide or magnesium carbonate) is then preferably added to a filter cake which had been obtained from freshly precipitated iron hydroxide-chromium hydroxide after removal of the aqueous phase. The subsequent processing of the Mg-containing filter cake normally includes also the following steps: Addition of lubricants such as graphite, drying at temperatures of about 150° to 220° C., shaping to tablets, and calcining. During this thermal treatment, the iron and chromium hydroxides on the one hand are transformed into the corresponding oxides, and magnesium hydroxide, magnesium carbonate or respectively hydroxycarbonate into magnesium oxide and partially by reaction with the iron oxide and the chromium oxide into the corresponding magnesium spinels ($MgFe_2O_4$ and $MgCr_2O_4$).

But also one can impregnate the dried filter cake of iron and chromium hydroxide or respectively the corresponding oxides with water-soluble and easily thermodecomposable magnesium salts, such as magnesium acetate, formate or oxalate, and thermally treat the mixture, whereby again magnesium oxide forms, which, if desired, can react with iron and chromium oxide to the corresponding spinels.

According to a less preferred form of realization, in which smaller magnesium oxide or magnesium spinel particles are formed, the catalyst of the invention can be obtained by co-precipitation of the iron oxide-chromium oxide component and of the magnesium oxide component or respectively precursors of these components, from the corresponding water-soluble metal salts with alkali and subsequent calcining of the precipitated mass. Suitable water-soluble metal salts are, e.g. the nitrates and sulfates of iron, chromium and magnesium, which are precipitated preferably with sodium carbonate or sodium hydroxide.

Regardless of how the magnesium component is applied on the iron oxide-chromium oxide component, the calcining is usually done at about 450° to 520° C., preferably at about 470° and 490° C.

The catalyst according to the invention is preferably in the form of shaped bodies, such as tablets or rings. For this purpose, the iron oxide-chromium oxide component and the magnesium oxide component or respectively their precursors are pressed to corresponding compacts before calcination. Normally, graphite is added as a lubricant.

The invention also relates to the use of the catalyst according to the invention for water-gas shift reaction with steam at temperatures of 300° to 400° C. at atmospheric or elevated pressure. In the latter case, one operates preferably in the range from about 10 to 100 bar.

The invention is explained by the following examples. The chemical and physical-chemical data of the catalysts thus produced are stated in the table. The decrease in loss of lateral crushing strength caused by the addition of magnesium oxide is clearly evident from the table. In addition, a positive effect on the thermoresistance of the catalysts was observed. This effect is generally reflected in a reduction in loss of surface area of the catalysts as measured by BET.

COMPARISON EXAMPLE 1

Production of the standard catalyst without MgO.

3200 ml deionized water were heated to 50° to 55° C. and therein 1500 g $FeSO_4.7H_2O$ were dissolved; then 85.5 g $Na_2Cr_2O_7.H_2O$ were added, and the solution was maintained at 55° C. to precipitation.

3400 ml deionized water and 680 ml 50% NaOH (D=1.525) were mixed and heated to 40° C. Then air was injected (400 liter/h) into the sodium hydroxide solution, and the Fe-Cr solution was added within 30 minutes while stirring. With further stirring and introduction of air, the suspension was heated to 60° C. and maintained at this temperature for 3 hours.

The precipitate was suction filtered, and the filter cake was washed by repeated suspension with 4000 ml deionized water of 60° C., until a resistance of >700 Ohm/cm was reached in the filtrate. In the last suspension, 21 g of natural graphite was added. The washed filter cake was dried for 15 hours at 220° C. The dried product was granulated through a 1.5 mm screen and pressed to cylindrical tablets of a diameter of 6 mm and a height of 6 mm. The tablets thus obtained were calcined for one hour at 480° C.

COMPARISON EXAMPLE 2

Production of a catalyst with cement as binder.

550 g of the filter cake obtained according to Example 1 from the precipitation (loss on ignition at 480° C.=55.5%) were mixed with 13.1 g portland cement for 15 minutes in a mix muller. The resulting mass was then dried for 15 hours at 220° C. and subsequently further treated as stated in Example 1.

EXAMPLE 1

Production of a magnesium oxide-containing catalyst.

Following the procedure of Example 1, the precipitation was carried out having 1500 g $FeSO_4.7H_2O$ and 85.5 g $Na_2Cr_2O_7.H_2O$. 550 g of the filter cake obtained (loss on ignition at 480° C.=55.6%) were mixed with 19.6 g $Mg(OH)_2$ (MgO content=65.7%) in the mix muller for 15 minutes. The mixture was dried at 220° C. for 15 hours and processed as described in Comparison Example 1.

EXAMPLES 2 AND 3

Production of magnesium oxide-containing catalysts

The production of these catalysts occurred as according to Example 1, but admixing 29.4 g $Mg(OH)_2$ according to Example 2 and 39.2 g $Mg(OH)_2$ according to Example 3.

EXAMPLE 4

Production of a magnesium oxide-containing catalyst.

The production of this catalyst followed the procedure used in the production of the catalyst of Comparison Example 1, except that instead of $Mg(OH)_2$, 30.7 g $MgCO_3$ (MgO content=42.0 wt.%) were admixed.

EXAMPLE 5

Production of a magnesium oxide-containing catalyst.

The production of this catalyst was identical to the method described in Comparison Example 1, adding to the filter cake washed and suspended in deionized water (corresponds to 244.2 g anhydrous substance) 30.7 g $MgCO_3$ (MgO content=42.0 wt.%). The further treatment occurred as according to Comparison Example 1.

EXAMPLE 6

Production of a magnesium oxide-containing catalyst.

The production of this catalyst was by the same method as that of Example 5, but admixing 46.1 g $MgCO_3$ rather than 30.7 g.

EXAMPLE 7

Production of a magnesium oxide-containing catalyst by co-precipitation of the components.

3200 ml deionized water were heated to 50° to 55° C. and 1500 g $FeSO_4.7H_2O$ and 152.7 g $MgSO_4$ were dissolved therein. Then 85.5 g of $Na_2Cr_2O_7.2H_2O$ was added and the solution was maintained at 55° C. to precipitation.

3400 ml deionized water and 745 ml 50% NaOH (D=1.525) were mixed and heated to 40° C.

The precipitation and subsequent further treatment was identical to the method described in Comparison Example 1.

EXAMPLE 8

Production of a magnesium oxide-containing catalyst.

The precipitation and production of the filter cake was the same as that for Example 3.

550 g of the obtained filter cake (heat loss at 480° C.=55.6%), dissolved in 150 ml deionized water, were impregnated with 46 g $Mg(CH_3COO)_2$, and the obtained mass was dried at 220° C. for 15 hours and thereafter processed as stated in the Comparison Example 1.

combined in the form of a spinel with the oxides of iron or chromium, said spinel having a crystallite size in the range of from 100 to 180 Å; and D. a nickel and cobalt concentration of less than 200 ppm.

2. A catalyst, as defined in claim 1, in which the iron oxide concentration, expressed either as $Fe^{+2}$ or $Fe^{+3}$ is in the range of 80 to 90% by weight; and the chromium oxide concentration is in the range of from 7 to 11% by weight.

3. A catalyst, as defined in claim 1, in which the magnesium oxide component is added to the iron oxide-chromium oxide constituents prior to calcination of the catalyst, and thereafter said catalyst is calcined at sufficient temperatures to form spinels of the magnesium with the iron and chromium constituents.

4. A catalyst, as defined in claim 1, wherein said catalyst is prepared by adding to precursors of the iron oxide-chromium oxide components in the form of the hydroxides or oxide hydrates of iron and chromium, the magnesium component said magnesium component comprising magnesium oxide, magnesium hydroxide, carbonate, acetate, formate or oxalate.

5. A catalyst, as defined in claim 1, in which the magnesium oxide is added to precursors of iron oxide-chromium oxide constituents the precursors comprising the hydroxides or oxide hydrates of the iron and chromium constituents.

6. A catalyst, as defined in claim 1, in which the magnesium constituent is added in the form of its oxide, hydroxide, carbonate, acetate, formate or oxalate to precursors of the iron oxide-chromium oxide components, said precursors comprising the hydroxides or oxide hydrates of iron and chromium in a precipitated mass.

| | | | | Chemical and Physical-Catalytic Data of the Catalysts Produced | | | | | | |
|---|---|---|---|---|---|---|---|---|---|---|
| Catalyst (Tablets 6 × 6 mm) | Additions | MgO Content (wt. %) (1) | Production Method (2) | BET Surface area (3) ($m^2/g$) | | LCS (4) (kg) | | Loss of LCS (%) | CO Conversion (5) (%) |
| | | | | f | g | f | g | | |
| Comp. 1 | — | — | S | 80 | 40 | 13.8 | 8.4 | 39.0 | 78.0 |
| Ex. 2 | Cement (5.0) | — | A | 73 | 48 | 16.2 | 11.6 | 28.4 | 65.8 |
| Ex. 1 | $Mg(OH)_2$ | 5.0 | A | 78 | 50 | 12.0 | 11.0 | 8.3 | 70.1 |
| 2 | $Mg(OH)_2$ | 7.5 | A | 82 | 44 | 12.0 | 10.7 | 10.8 | 61.2 |
| 3 | $Mg(OH)_2$ | 10.0 | A | 93 | 44 | 12.4 | 9.9 | 20.2 | 61.7 |
| 4 | $MgCO_3$ | 5.0 | A | 48 | 43 | 13.2 | 11.3 | 15.2 | 66.2 |
| 5 | $MgCO_3$ | 5.0 | B | 46 | 43 | 13.9 | 11.0 | 21.0 | 67.9 |
| 6 | $MgCO_3$ | 7.5 | B | 47 | 38 | 15.0 | 10.9 | 27.4 | 63.2 |
| 7 | $MgSO_4$ | 5.0 | C | 78 | 50 | 11.2 | 8.3 | 26.0 | 77.2 |
| 8 | $Mg(OOCCH_3)_2$ | 5.0 | D | 47 | 40 | 10.5 | 9.3 | 11.4 | 61.9 |

Explanations concerning the table:
(1) MgO content in the finished catalyst.
(2) Production method: S = Standard, A = Admixing the magnesium compound to the filter cake, B = Admixing the magnesium compound to the aqueous suspension of the precipitated Fe and Cr hydroxide, C = Joint precipitation, D = Impregnation of the dried filter cake with magnesium acetate.
(3) Determined was the BET surface area of the fresh (f) and of the used (g) catalyst after the test.
(4) The lateral crushing strength (LCS) of the fresh (f) and of the used (g) catalyst after the test was determined, namely with 6 × 6 mm tablets. The loss of lateral crushing strength was determined after performance of the activity test (running time 8 hours). For this purpose, the catalyst tablets were removed from the test reactor under nitrogen and measured with a commercial instrument for crushing strength determination.
(5) The CO conversion was determined under the following reaction conditions: T = 370° C., P = 50 bar, ratio $H_2O$/gas = 1.0; gas composition (%): CO = 49.6, $CO_2$ = 4.7, $H_2$ = 45.7; space velocity (HSV) = 3000 vol. gas per vol. of catalyst per hour; thermodynamically possible conversion = 94.2%.

We claim:

1. A high-temperature water-gas shift reaction catalyst, which comprises:
A. a major portion of iron oxide;
B. a minor portion of chromium oxide;
C. a minor portion of magnesium oxide, in the range of from 4 to 6% by weight, in which at least a portion of said magnesium oxide is chemically 7. A catalyst, as defined in claim 1, in which the iron oxide-chromium oxide and magnesium oxide components are obtained by coprecipitation from an aqueous solution of iron, chromium and magnesium salts, respectively, by the addition of alkali, followed by a subsequent washing, drying and calcining of the precipitated mass.

8. A catalyst, as defined in claim 1, in which precursors of the iron oxide, chromium oxide and magnesium oxide constituents have been calcined at a temperature in the range of from 450° to 520° C.

9. A catalyst, as defined in claim 1, in which iron oxide, chromium oxide and magnesium oxide precursors have been calcined at temperatures in the range of 470° to 490° C., whereby magnesium spinels are formed with the oxides of iron and chromium.

10. A method of making an iron oxide, chromium oxide, magnesium oxide catalyst, wherein said magnesium oxide is in the range of 4 to 6% by weight of the catalyst, and said catalyst having discrete particles of magnesium spinels of iron and chromium oxide having a crystallite size in the range of from 100 to 180 Å distributed therethrough, which comprises the steps of:
  A. forming an aqueous solution of a water-soluble iron salt;
  B. forming an aqueous solution of an alkali metal salt of chromium;
  C. adding said aqueous salt of an alkali metal salt of chromium to said aqueous solution of said iron salt and forming a precipitate of insoluble salts of iron and chromium;
  D. mixing a magnesium compound with said precipitate;
  E. drying said precipitate and calcining said precipitate at a temperature sufficiently high to convert the insoluble metal salts to their oxide form and to react the magnesium compound with the oxides of iron and chromium to form discrete particles of the spinels of magnesium and the oxides of iron and chromium of a crystallite size in the range of from 100 to 180 Å.

11. A method of making a catalyst, as defined in claim 10, in which said magnesium compound comprises the hydroxide, carbonate, acetate, formate or oxalate of magnesium.

12. A method of producing a catalyst, as defined in claim 10, in which the magnesium compound is added to an aqueous suspension of the insoluble salts of the iron and chromium precipitate.

13. A method of preparing a catalyst, as defined in claim 10, in which the magnesium compound is added as an aqueous metal salt to the iron oxide and chromium oxide soluble salts, so as to be coprecipitated with said iron oxide and chromium oxide constituents.

14. A method of preparing a catalyst, as defined in claim 13, in which the water soluble metal salts are selected from the group consisting of the nitrates and sulfates.

15. A method of preparing a catalyst, as defined in claim 10, in which the calcination is carried out at a temperature in the range of from 450° to 520° C.

16. A method of preparing a catalyst, as defined in claim 10, in which the calcination temperature is in the range of from 470° to 490° C.

17. A method of preparing a catalyst, as defined in claim 10, in which the iron oxide, chromium oxide and magnesium oxide components are compacted prior to calcination.

18. A method of preparing a catalyst, as defined in claim 17, in which a small concentration of between 1 and 5 weight percent of graphite is added to the admixture of iron oxide, chromium oxide and magnesium oxide as a pelletizing lubricant.

19. A method of making a catalyst, as defined in claim 10, in which at least 70 wt.% of the magnesium compound has a particle size in the range of from 5 to 15 microns.

* * * * *